United States Patent

[11] 3,552,556

[72] Inventor Vriel A. Hall
    503 Presidio, San Clemente, Calif. 92672
[21] Appl. No. 791,390
[22] Filed Jan. 15, 1969
[45] Patented Jan. 5, 1971

[54] APPARATUS FOR TRANSPORTING AND LIFTING LOADS
    6 Claims, 4 Drawing Figs.
[52] U.S. Cl. .................................................. 214/512,
    137/344; 254/4; 280/43.11
[51] Int. Cl. .................................................. B60p 1/02
[50] Field of Search .......................................... 214/506,
    512; 280/5E, 5C, 5, 43.11, 43.19; 254/4; 137/344;
    187/26

[56] References Cited
    UNITED STATES PATENTS
    3,160,171  12/1964  Klein .................... 137/344
    3,315,929   4/1967  Keiser ................... 137/344
    3,348,572  10/1967  Hall ..................... 280/43.22
    3,352,461  11/1967  Dascanio ................ 137/344X
    3,407,836  10/1968  Keiser ................... 137/344

*Primary Examiner*—Albert J. Makay
*Attorney*—Nienow & Frater

ABSTRACT: This invention relates to wheeled load conveyances of the type having a load container to be elevated when the conveyance is not moving and is to be stabilized against movement. The embodiment shown in the drawing is incorporated in a portable water carrier which includes a vehicle frame mounted on wheels and a water tank mounted on the frame by a supporting structure which can be moved to elevate the load above the frame. A stabilizing structure is included to which the weight of the vehicle and the load can be transferred to remove that weight from the wheels. Force is applied to the movable supporting structure to raise the tank and this movement is utilized to transfer weight from the wheels to the stabilizing structure, which in this case is the frame itself. Force is applied by a block and tackle arrangement to raise the tank from the frame. A second block and tackle arrangement utilizes that movement, the relative movement between the frame and the tank, to accomplish relative movement between the wheels and the frame whereby to transfer the load between the wheels and frame.

PATENTED JAN 5 1971
3,552,556
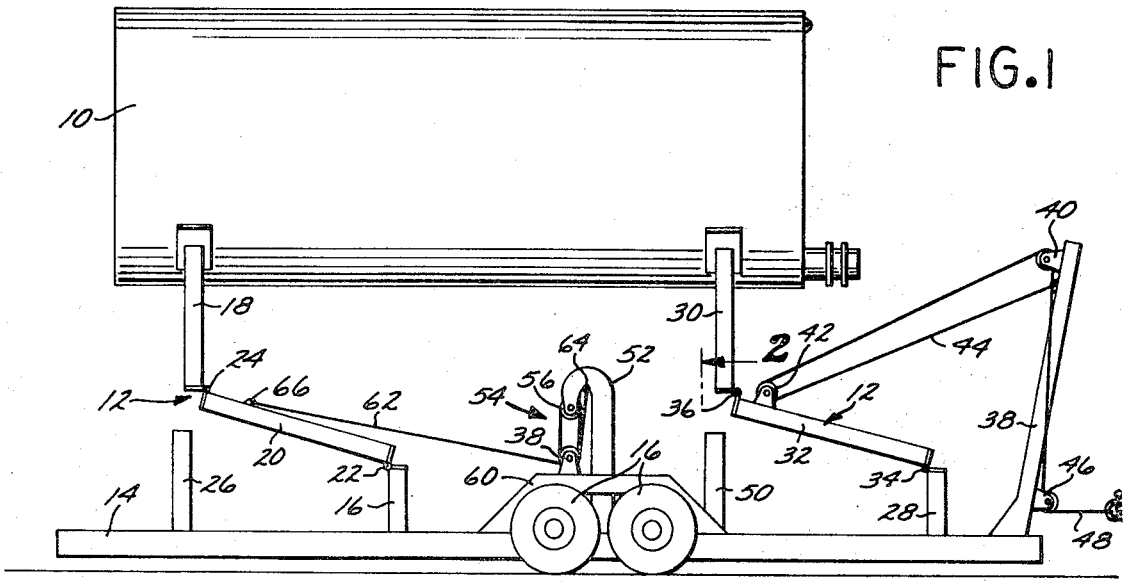
FIG.1
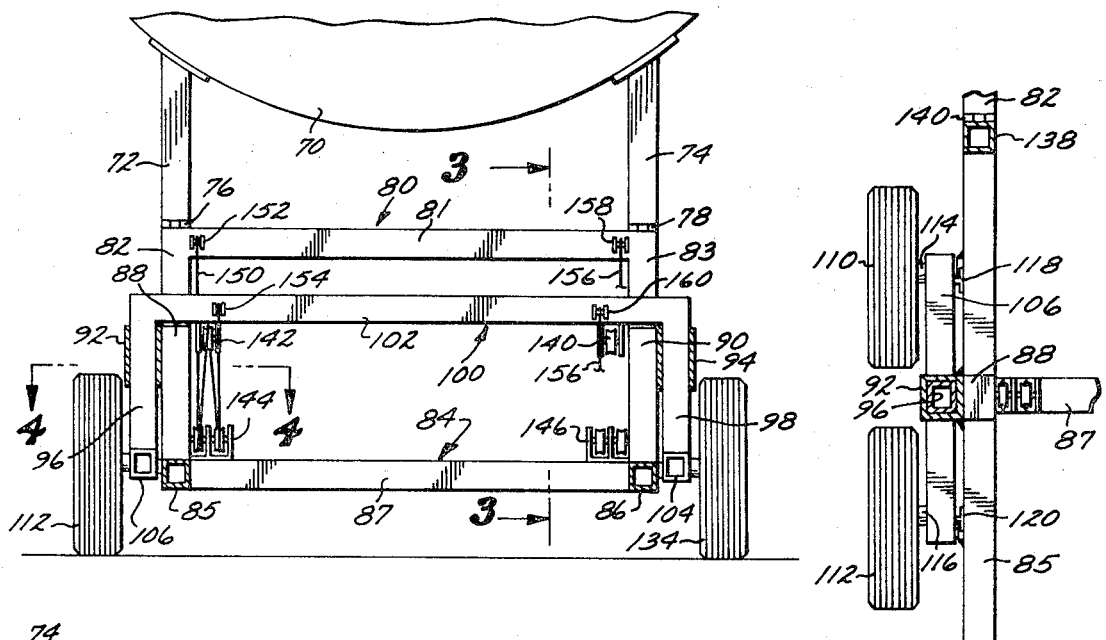
FIG.2
FIG.4
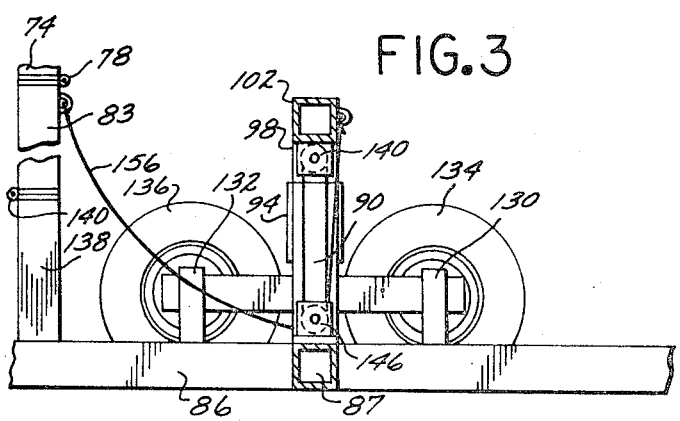
FIG.3
INVENTOR.
VRIEL A. HALL
BY
Nienow & Frater
ATTORNEYS

APPARATUS FOR TRANSPORTING AND LIFTING LOADS

This invention relates to improvements in load conveying apparatus of the type including a load container which is to be elevated following transportation of the load from one place to another. The invention relates particularly to wheeled apparatus of this kind wherein it is desirable to transfer the load from the wheels to a more stable platform element when the load has been transported to the location at which it is to be lifted.

An object of the present invention is to provide a structure in which the removal of the load from the wheels and the raising of the load are coordinated in time so that stability is insured during load elevation. The invention makes it possible to perform the two functions, transferring the weight from the wheels to a more stable nonrolling structure and elevation of the load, by the application of a single force. It is an object to make such operation possible and this is one of the more important objects of the invention because multiple power sources are often not available whereas in heavy load applications great force is required both to lift the load and to safely transfer the weight from the wheels to the stabilizing structure.

This is true, for example, in the case of portable water supplies in which a large tank is fitted with wheels so that it can be transported to sites where water is unavailable there to be elevated so that it can be transported to other vehicles. Such an apparatus is disclosed in U.S. Pat. No. 3,348,572 granted to Vriel A. Hall on 24 Oct. 1967. Tanks of the kind shown in that patent are made in very large size so that they are exceedingly heavy when filled with water. A great amount of power is required to raise such a tank and a great amount of power is required to safely transfer the weight of such a tank from the vehicle wheels to the stabilizing elements. The water conveyance illustrated in the patent employ separate means for lifting the tank and for transferring weight from the wheels. One object of the present invention is to provide a structure in which these two tasks may be done simultaneously and one particular object is to provide such a structure which is applicable to the apparatus shown and described in that patent.

The utility of the invention is not limited to water tank transportation structures but the invention has proven to be particularly advantageous in that application. Accordingly, the embodiment selected for illustration in the drawing is shown in its application to portable water tanks.

These several objects and advantages of the invention, and others which will hereinafter appear, are realized in part by the provision, in a load conveyance of the type having a load container to be elevated while the conveyance is stationary, of: wheels upon which the conveyance is mounted; of stabilizing means carried by the conveyance and comprising an element movable relative to the wheels to the level of the bottom of the wheels for transferring a portion of the weight of the load from the wheels to said element; and by the provision elevating means comprising movable support elements interconnecting said wheels and said load container for elevating said load container relative to said element and for lowering said element relative to said wheels.

In the drawings:

FIG. 1 is a schematic drawing representing an apparatus incorporating the invention;

FIG. 2 is a cross-sectional view of a portable water carrier which is seen looking rearwardly from a plane just ahead of the wheels and generally corresponding to the plane designated 2-2 in the schematic of FIG. 1;

FIG. 3 is a cross-sectional view taken on line 3-3 of FIG. 2 except that whereas the wheels were shown to be lowered relative to the frame in FIG. 2, the wheels have been raised relative to the frame in FIG. 3; and FIG. 4 is a cross-sectional view taken on line 4-4 of FIG. 2 looking downwardly on the wheel carriage at one side of the apparatus.

Referring to FIG. 1 of the drawing, the apparatus there shown comprises a load container 10 which may comprise a tank, as shown, suitable for carrying water or fertilizer or other liquids to a job site or to a field, as the case may be. The invention is not limited to apparatus for carrying liquids. The container 10 could as well be arranged for transporting portable solids and other materials.

In FIG. 1, the numeral 12 generally designates a means by which the load container may be elevated. In this schematic, the load container 10 is carried upon a frame structure 14 which is made portable by being mounted upon wheels 16. The apparatus shown schematically in FIG. 1 further comprises a stabilizing means by which the weight of the load is transferred from the wheels to some more stable support member. In FIG. 1 means are provided for raising the wheels 16 relative to the frame, or conversely lowering the frame 14 relative to the wheels 16, so that the frame will come to rest upon the ground and will bear the load. Thus, in this schematic, this stabilizing means or element comprises the frame 14.

The elevating means 12 comprises a movable support structure interconnecting the load container with the frame and wheels. This means may have a variety of forms. Thus it could comprise a telescoping structure, an interslide, a gin pole mechanism or a folding mechanism. The latter has been selected for illustration and it comprises several elements in the schematic. At the left in FIG. 1 it comprises a post 16 which is fixed to the frame 14 and a post 18 which is fixed to the load container 10. The two posts are interconnected by an arm 20 which has hinged connection at one end to the post 16 by a hinge 22 and has hinged connection to the post 18 by a hinge 24. The post 26 serves as a stop which is engaged by the post 18 when the load container is lowered whereby the degree of lowering is lowered. At the right in FIG. 1 the elevating means further comprises a post 28 which is fixed to the frame 14 and a post 30 which is fixed to the load container 10. The two posts are interconnected by an arm 32 which is pivotally connected to post 28 by a hinge 34 and is pivotally connected to the post 30 at its other end by a hinge 36. The elevating means further comprises a post 38 which stands upwardly from the forward end of the frame 14 to which it is rigidly fixed. A pulley 40 is fixed to the upper end of post 38. A cooperating pulley 42 is fixed to the arm 32. Elevation is accomplished by pulling upon a cable 44 which is secured at one end of the post 38 and is weaved through the pulley 42 and over the pulley forward to a direction changing pulley 46 carried at the lower end of the post 38. Elevation is accomplished by hauling on the standing part 48 of the cable 44. The load is lowered by releasing the standing part of the cable back towards the pulley set. The post 50 serves as a stop, in cooperation with the post 30, to limit the degree in which the forward end of the load container may be lowered.

The wheels 16 may be elevated and lowered relative to the frame 14 which, as previously described, serves as the stabilizing element. To permit this action, the wheels are mounted upon a wheel frame structure 52 and means are provided by which this structure 52 can be raised and lowered relative to the frame. This means, which is generally designated 54 in FIG. 1, is represented by a pulley 56 which is secured to the wheel frame 52, by a pulley 58 which is secured to a structure 60 comprising part of frame 14, and by a cable 62 which is weaved through the pulleys 56 and 58. Cable 62 has one end connected to the load container or to some element in the elevating structure which is raised and lowered relative to the frame during the load container elevation and lowering process. Here, that end of the cable is connected at 66 to a point on arm 20. The other end of the cable 62 is connected to one of the frame 14 or the wheel support structure 52. In this case the end of the cable is shown to be connected at 64 to the wheel support structure 52; but, it will be apparent that the cable and pulley set could be otherwise arranged so that the cable, instead of being connected at point 64, could be connected to a point on the frame or the pulley support structure 52. In this embodiment, the cable extends from point 64 through one of the pulleys of pulley set 58 and thence over pulley 56 back to another pulley of the set 58. Thereafter it extends to the point 66. As point 66 is moved closer to pulley 58, cable 62 is paid into the pulley set permitting the frame to be lowered relative to the wheel frame 52 and the wheels 16. When a sufficient length of the cable 62 is so paid into the pulley set, the frame will rest upon the ground and thereafter will bear the load, rather than the wheels, because the load has physical connection directly to the frame. Posts 18, 30, 16, 28 and arms 20 and 32. When the load is lowered the cable 62 is pulled from the pulley set whereby the separation of the two pulleys 56 and 58 is lessened and whereby the wheels 16 are forced downwardly relative to the frame until the load is borne by the wheels. It will be apparent that the distance from point 66 to pulley set 58 is reduced as the arm 20 rotates clockwise, in FIG. 1, as an incident to actuation of the elevating means and specifically by pulling on the standing part 48 of cable 44. Conversely, when the load is lowered by paying cable 44 into the pulley set 40 and 42, the distance from point 66 to pulley set 58 will increase. Thus, it is that the wheels are raised and lowered relative to the frame as the load container is lowered and raised, respectively, by operation of the elevating means 12.

It is a feature of the invention that the actuation of the wheels relative to the frame occurs during the first degrees of elevational movement and during the final degrees of lowering movement. This is accomplished by using a lesser degree of purchase, that is a smaller mechanical advantage, in the system that accomplishes the relative motion between the wheels and frame than is employed in the system that causes relative movement between the frame and the load container. It is accomplished by the further device of arranging the two systems so that that one which results in relative movement between frame and wheels is loaded immediately upon the start of elevational movement of the load container.

The specific embodiment of the invention illustrated in FIG. 3 comprises a load container in the form of tank 70 which is supported upon a pair of posts 72 and 74 which are just like the post 18 in FIG. 1. These posts have hinge connections at hinge 76 and 78, respectively, to the upper end of an arm structure 80 which comprises the crossmember 81 and the arms 82, at the left, and 83, at the right. This arm structure 80 corresponds to the arm 20 in FIG. 1. The load is carried upon a frame which is generally designated 84 and is fabricated from box-shaped structural members two of which, 85 and 86, comprise the side bars of the frame. They are interconnected by a crossbar 87 in the region of the wheels upon which the frame is mounted. A short upright extends vertically upward from the upper face of the sidebars at a point adjacent connection to the crossmember 87. This upright is designated by the reference numeral 88 at the left in FIG. 2 and by the numeral 90 at the right. As best shown in the case of upright 88 in FIG. 4, the upper end of the upright is sealed closed. A length of box section bar is secured to the outboard side of each of the uprights 88 and 90. The section secured to upright 88 is designated by the reference numeral 92 and the other length of box section is secured to the upright 90 and is designated by the reference numeral 94. These two box sections, 92 and 94, serve as guides for up and down movement of the arms 96 and 98, respectively, of a generally U-shaped wheel support structure. This structure, generally designated 100, further comprises the crossmember 102 which interconnects the arms 96 and 98. The lower end of the arm 89 is connected to the center of a walking beam 104 which is disposed generally horizontally to the frame bar 86 at the right of the unit in FIG. 2.

At its lower end, the arm 96 is connected to the central portion of a walking beam structure 106 which is disposed generally horizontally to an outboard of the sidebar 85 at the left in FIG. 2. The structure that walking beam and its connection to the wheels is best illustrated in FIGS. 2 and 4. Referring to FIG. 4, the wheels 110 and 112 are connected to the walking beam 106 by axles 114 and 116, respectively. The ends of the walking beam have sliding connection to the sidebars of the frame. These connections are designated by the numeral 118 adjacent wheel 110 and by the numeral 120 adjacent wheel 112. These connecting structures 118 and 120 comprise interlocking parts one of which is carried by the walking beam and the other of which is carried by the sidebar of the frame. The latter is visible in FIG. 3 where the forward one is designated by the reference numeral 130 and the rearward one is designated by the reference numeral 132. At this side of the unit the wheels are designated by the numeral 134, in the case of the forward wheel, and 136 in the case of the rear wheel. In FIG. 3 the post 138 and the hinge 140 correspond to post 16 and hinge 22 in FIG. 1. The pulley 140 in FIG. 3 corresponds to pulley 56 in FIG. 1.

In the embodiment of FIGS. 2, 3 and 4, two sets of pulleys and cables are employed. Thus pulley 142, at the left in FIG. 2, also corresponds to pulley 56 of FIG. 1. Pulleys 140 and 142 are fixed to the underside of crossmember 102 of the wheel support frame 100. Pulley sets 144 and 146 are fixed to the frame 84 at crossmember 87. They correspond to pulley set 58 in FIG. 1. A cable 150 extends from a connection 152 on elevation arm 80 around the leftmost pulley of set 140, thence up to and around pulley 142, thence down and around the rightmost pulley of pulley set 144 and thereafter back up to a connection at 154 on the wheel support structure 102. A cable 156 is similarly wound around pulley 140 and pulley set 146 between a connection 158 on arm 80 and a connection 160 on the wheel support 100 at crossmember 102.

Most of the cable 156 is broken away in FIG. 2 so that the pulley arrangement is more easily visible but in FIG. 3 all of the visible portions of the cable are shown to illustrate that it is slack when the load is raised and the stabilizing element (here the frame) is lowered relative to the wheels. It will be apparent that the cable will not become taut until the elevation elements are lowered almost entirely. Then it will become taut and pull the frame up toward the wheel support structure to shift the vehicle weight to the wheels.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. In combination:
    a load container;
    a stabilizing frame disposed generally horizontally below the container;
    means for raising and lowering said load container and for raising and lowering said frame including a pair of moveable support structures connected at one end to spaced points on opposite ends of the load container and at the opposite end to horizontally spaced points on opposite ends of said frame;
    wheels carried by the frame intermediate said horizontally spaced points of the frame; and
    wheel positioning means comprising a block and tackle system responsive to raising and lowering of the load container relative to the frame for respectively lowering and raising the frame relative to the wheels while maintaining the wheels in a position between said spaced points of the frame.

2. In a load conveyance of the type having a load container to be elevated while the conveyance is stationary:
    transporting wheels upon which the conveyance is mounted;
    stabilizing means carried by said conveyance and comprising an element moveable relative to said wheels to the level of the bottom of said wheels for transferring a portion of weight of the load from the wheels to said element;
    elevating means comprising a moveable support structure interconnecting said wheels and said load container for elevating the latter relative to said element and for lowering said element relative to said wheels;

said elevating means being effective to lower said element relative to said wheels during initial elevational movement of said load container;

said conveyance comprising a frame, said wheels being mounted on said frame and moveable relative thereto in a vertical direction, said support structure interconnecting said frame and said load container, and said elevating means further comprising means for translating movement relative to said frame of said support structure and said load container into relative motion between said wheels and said frame; and in which said means for translating movement of the support structure and the load container relative to the frame comprises a block and tackle system the tackle of which is extended and contracted as an incident to movement of said support structure and said load container relative to said frame.

3. The invention defined in claim 2, in which said elevating means further comprises a block and tackle element connected to said frame and said support structure and effective as an incident to application of external force to the tackle thereof to cause movement of said support structure in direction to alter the degree of elevation of said load container.

4. The invention defined in claim 3, in which said support structure comprises arms pivoted at one end on said frame and pivoted at the other end on said load container.

5. The invention defined in claim 4, in which said wheels include a resilient element which is subjected to the weight of the conveyance and is interposed between the frame and the surface on which said wheels rest.

6. In a load conveyance of the type having a load container to be elevated while the conveyance is stationary:

transporting wheels upon which the conveyance is mounted;

stabilizing means carried by said conveyance and comprising an element moveable relative to said wheels to the level of the bottom of said wheels for transferring a portion of weight of the load from the wheels to said element;

elevating means comprising a moveable support structure interconnecting said wheels and said load container for elevating the latter relative to said element and for lowering said element relative to said wheels;

said conveyance comprising a frame, said wheels being mounted on said frame and moveable relative thereto in a vertical direction, said support structure interconnecting said frame and said load container, and said elevating means further comprising means for translating movement relative to said frame of said support structure and said load container into relative motion between said wheels and said frame; and in which said means for translating movement of the support structure and the load container relative to the frame comprises a block and tackle system the tackle of which is extended and contracted as an incident to movement of said support structure and said load container relative to said frame.